United States Patent [19]

Hino et al.

[11] 4,228,037

[45] Oct. 14, 1980

[54] SPHERICAL ACTIVATED CARBON HAVING LOW DUSTING PROPERTY AND HIGH PHYSICAL STRENGTH AND PROCESS FOR PRODUCING THE SAME

[75] Inventors: Kuniaki Hino, Tokyo; Yasuo Uehara, Iruma; Yasushi Nishimura, Ichigayadai; Kazuhiro Watanabe, Ichihara; Yoshio Okada, Tokyo, all of Japan

[73] Assignee: Kureha Kagaku Kogyo Kabushiki Kaisha, Tokyo, Japan

[21] Appl. No.: 6,495

[22] Filed: Jan. 25, 1979

[30] Foreign Application Priority Data

Feb. 6, 1978 [JP] Japan ................................. 53/12139

[51] Int. Cl.$^2$ .................... C01B 31/08; C01B 31/10; B01J 21/18
[52] U.S. Cl. ................................. 252/444; 252/421; 252/445; 264/29.1; 264/29.5; 423/445
[58] Field of Search ....................... 252/421, 444, 445; 423/445, 449; 264/29.3, 29.5, 29.1

[56] References Cited

U.S. PATENT DOCUMENTS

| | | | |
|---|---|---|---|
| Re. 29,101 | 1/1977 | Amagi et al. | 423/445 |
| 3,891,574 | 6/1975 | Kobayashi et al. | 252/445 |
| 4,124,529 | 11/1978 | Jüngteh et al. | 252/421 |

FOREIGN PATENT DOCUMENTS

| | | | |
|---|---|---|---|
| 1542620 | 6/1970 | Fed. Rep. of Germany . | |
| 49-18556 | 5/1974 | Japan | 55/74 |
| 1318324 | 5/1973 | United Kingdom . | |
| 1468982 | 3/1977 | United Kingdom . | |
| 1474599 | 5/1977 | United Kingdom . | |

OTHER PUBLICATIONS

Chemical Abstracts—vol. 82, No. 4 (1/27/75) 19043f—p. 145.

*Primary Examiner*—P. E. Konopka
*Attorney, Agent, or Firm*—Stevens, Davis, Miller & Mosher

[57] ABSTRACT

A process for producing spherical particles of activated carbon having a low susceptibility to dusting.

11 Claims, No Drawings

SPHERICAL ACTIVATED CARBON HAVING LOW DUSTING PROPERTY AND HIGH PHYSICAL STRENGTH AND PROCESS FOR PRODUCING THE SAME

This invention relates to a spherical activated carbon having a high physical strength and excellently low susceptibility to dusting and also to a process for producing the same.

Activated carbon has become of major interest for the purpose of controlling the industrial environmental pollution or cleaning up the surroundings, with a sharp increase of the demand. Of course, activated carbon has long been widely used in the food or medical industry. In recent years, there has been developed an application of activated carbon to blood purification using artificial internal organs, thus enlarging the range of applications of activated carbon more and more.

Heretofore, activated carbon has been mainly used in the form of powder. Since, however, the carbon powder has been encountered several problems such as of poor economy due to its difficulty in reuse and generation of dust in handling, there is a strong demand of a granular or particulate product of activated carbon. A number of processes of producing granular activated carbon have been accordingly developed and proposed, by which there are now produced various forms of activated carbon such as fragments, cylinders and spheres.

In application, on the other hand, one of the great factors imposed on the activated carbon resides in its physical strength. Activated carbon is generally used to efficiently remove impurities from a liquid or gas phase by the intense adsorbing action thereof which results from its large surface area and specific distribution of pore diameters. If granules or particles of activated carbon are small in their physical strengths, dust is irresistibly developed when they are frictionally contacting each other. In applications in gas phase, such dust will be readily entrained in discharged gas in large amount, causing secondary environmental pollution. For application in liquid phase, e.g. for treatment of effluent or sewage, the dust will cause a black color stain of the discharged water. The dust will cause contamination of liquid when applied to the field of purification or refinement. Further, in a specific field of application, an extremely small amount of dust may produce a serious problem. Especially in the case of blood purification, the dust must be removed strictly to the utmost limit. Thus, there is an eager demand of and low dusting activated carbon with strength.

As a countermeasure for the dusting from a standpoint of users, there have been made a number of attempts on the assumption that the dust is invariably produced. Such attempts include, for example, a removal of dust using filters, a treatment such as of coagulation and precipitation, washing with water in large amount, coating of activated carbon on the surfaces thereof with polymers of organic or inorganic materials for forming a film on the surfaces so as to make the carbon particles not to directly contact each other, and a method of increasing physical strengths of activated carbon by application of coating materials.

Alternatively, the specification of Japanese Patent Publication No. 50-18879 discloses a process of producing spherical activated carbon in which a particular attention is directed to the form of activated carbon. In this process, a specific pitch is used as a starting material for preparing the spherical activated carbon without use of any binder and by using the specific fusibility of the pitch. Accordingly, the dust generation is reduced as compared with round carbon granulated from powder or granular fragmental carbon. In certain cases, however, it is desirable to reduce the amount of generation of dust to a much lower level.

Moreover, it will be noted that the above-mentioned process of realizing the low level of dusting by the surface coating of activated carbon is disadvantageous in that the adsorbing ability inherent to activated carbon must be sacrificed to a considerable extent and that the dusting can not be completely suppressed.

In order to increase physical strengths of activated carbon moldings while attaining a low level of dusting, there are known further processes in which a pitch or a third component is added. In all of these processes, it is intended that the materials used as the additives are left in the activated carbon as much as possible after the carbonization treatment and that the additives themselves serve as a binder after the carbonization treatment to increase the physical strengths of the carbon.

As will be understood from the above, substances or materials which do hardly remain in the carbon after carbonization and thus do not serve as a binder are generally believed not to produce any significant effect of increasing the physical strengths of the final activated carbon since the addition of such substances results in voids in the carbon after the carbonization treatment.

Accordingly, the principal object of the present invention is to provide a novel spherical activated carbon having a greatly lowered dusting property and high physical strength, and also to provide a process for preparing the same.

Other objects and advantages of the invention will become more apparent hereinafter, and these and other objects of the invention can be accomplished by the spherical activated carbon of the invention which is obtained from a blended composition as starting material comprising a pitch as a principal carbon component, at least one aromatic compound as an organic solvent miscible with the pitch and a polymer of a chain hydrocarbon and/or a copolymer thereof as an effective component for providing the resultant activated carbon with an excellently low-dusting property.

The product, composition and process of the invention may be more fully understood from the following preferred embodiment which is offered by way of illustration and not by way of limitation:

The pitch used as the one component of the starting material is that which has a softening point of 50°–350° C., preferably 150°–250° C., a carbon content of 80–97%, a hydrogen/carbon atomic ratio of 0.3–2.0, and a nitrobenzene-isoluble matter content of below 60%. The term "softening point" used herein is intended to mean the temperature at which a piston of a KŌKA type flow tester charged with 1 g of the specimen comes to a first stop during its lowering movement which occurs upon heating the specimen at a temperature increasing at a rate of 6° C./min. under a load of 10 kg/cm$^2$. The term "nitrobenzene-isoluble matter content" means a ratio by % by weight of insoluble matter remaining when 1 g of pitch powder is added to 100 ml of nitrobenzene and dissolved at 40° C.

Usually, any pitch derived from petroleum cracking or derived from coal is adequately used.

In the practice of the invention, at least one aromatic compound which serves as an organic solvent miscible with the pitch is added to the pitch to ensure dispersion molding of the pitch. The pitch is mixed with and liquefied in the solvent at 150°-250° C., whereupon a polymer of a chain hydrocarbon (e.g. polyethylene, polypropylene, polybutadiene, polystyrene or the like), a copolymer having the hydrocarbon as a major component thereof (e.g. ethylene-vinylacetate copolymer) or a mixture thereof, which has a molecular weight less than about 500,000 and is less susceptible to decomposition at the mixing and liquefying temperature, is further added to the mixture and liquefied. Of these polymers mentioned above, polyethylene is most preferably used. The amount of the polymeric material is preferred to be in the range of 0.1-10%, and more preferably, 0.5-8% by weight of the employed pitch. Less amount than 0.1% by weight gives a less effect of preventing the dusting of the resulting activated carbon. On the other hand, larger amount than 10% by weight will produce several problems that the viscosity unfavorably increases on mixing with the pitch, tending to impede the dispersion molding and that even if the dispersion molding is feasible, infusible pitch is difficult to obtain.

The polymeric material used may be in the form of powder or pellets. It is important that, upon liquefying in or mixing with the pitch, the polymeric material is satisfactorily mixed with the pitch in the temperature range of 150°-250° C. In the sense, the polymeric material is preferred to have a molecular weight less than about 500,000 which allows good miscibility with the mixing system under such temperature range as defined above.

The aromatic compounds as solvent are, for example, aromatic hydrocarbons of one to three rings such as benzene, toluene, xylene, naphthalene, methylnaphthalene, dimethylnaphthalene, anthracene, phenanthrene, triphenylene, diphenyl, diphenylmethane, diphenyl ether, etc., and their alkyl derivatives may be also used.

One or more aromatic compounds mentioned above are admixed with the pitch. Though the mixing ratio is not critical, it is preferred to use 5-50 parts by weight of the aromatic compound per 100 parts by weight of the pitch.

The molten pitch mixture thus obtained is discharged into water containing a suspending agent such as polyvinyl alcohol and heated to 50°-200° C., if necessary in an autoclave, and quickly agitated to permit the dispersion molding of the pitch, followed by cooling to obtain spherical pitch.

The aromatic compound used as the organic solvent in the molding process is then removed by extraction with a solvent which exhibits sparing solubility against the pitch and polymeric material but shows good miscibility with the added organic solvent. Subsequently, the spherical pitch is subjected to an infusibilization treatment with an oxygen-containing oxidant. Usually, the infusibilization treatment is conducted in air while gradually heating from room temperature, and is completed at a temperature of below 400° C. The infusibilized spherical pitch is then heated and carbonized in an atmosphere of $N_2$ or steam, and activated at 900°-1000° C. As a result, there can be obtained highly spherical, very low dusting activated carbon with high strength. The thus obtained activated carbon has the following physical characteristics: spheres of 0.1-1.5 mm in diameter; particle density of 0.5-1.5 g/ml; specific surface area of 800-1600 m²/g; a micro-pore capacity of above 0.3 ml/g as measured in the range of micro-pore radius of below 100 Å, and also of below 0.5 ml/g as measured in the range of micro-pore radius between 100 Å and 100,000 Å; and the ash content of below 0.5% by weight.

The physical strengths and dusting amount of the activated carbon according to the invention are completely different in level or degree from those of known activated carbon. With the known carbon, the amount of dust produced by a dusting test is at such a level as can be correctly indicated by the gravimetric analysis. On the other hand, the activated carbon obtained according to the invention is at such a low dusting level that it is difficult to measure the dust by the gravimetric analysis. Accordingly, the difference between the activated carbon of the present invention and those of the prior art is expressed herein in terms of light transmittance which is determined by vigorously shaking a carbon sample in aqueous solution and measuring the turbidity of the solution by the use of a photoelectric photometer.

The activated carbon according to the present invention has a number of excellent characteristics including not only the low dusting tendency, but also excellent adsorbing ability without involving any problem of lowering of the adsorbing ability as will be experienced with the case of activated carbon obtained such as by the known surface coating method. The adsorbing ability of the activated carbon of the present invention is so excellent as to be comparable to that of conventionally produced activated carbon which contains no polymeric material used in the present invention. Further, the activated carbon of the invention has been found to be much superior in physical strength to conventional ones.

The observation, on surface or sectional area, of various types of activated carbon made with or without addition of the aforementioned polymeric material by a scanning electron microscope of high magnifications has revealed that the polymeric material-containing activated carbon is very smooth and uniform on the surface thereof.

Though it is not clearly known how the polymeric material admixed with the pitch on its liquefing contributes to realization the low dusting level of the resultant activated carbon, it may be assumed from the significant effect is attained according to the invention as follows. As is well known, the starting pitch is a mixture of substances having a wide molecular weight distribution ranging from low molecular weights to high molecular weights. In particular, the nitrobenzene-insoluble matter contains not only high molecular weight substances, but also components such as free carbon. Accordingly, if the melt viscosity or viscosity of solution is lowered, there may take place a phase separation. This is considered due to the lack of so-called "tackiness" based on the small molecular weight of the pitch. When the phase separation occurs during the molding, a heterogeneous phase is developed and grows in the molded spherical pitch, remaining in the final activated carbon and thus lowering the surface strength of the carbon.

The activated carbon formed from pitch as a starting material is composed of a binder and a framing component which are coexisting together. If the binder component is not uniformly distributed within the spherical body, the sphere will have a non-uniform distribution of strength. It is believed that the activated carbon obtained by carbonizing and activating such spheres is lowered in strength in portions where the binder is insufficient or the framing component is collecting together, from which dust is apt to develop.

The addition of the polymeric material is considered to contribute to the uniform distribution of the binder component in a molten state of the pitch mixture. In addition, the polymeric material hardly decomposes at 150°–250° C. and does not suffer from rapid decomposition in the infusibilization step after the molding of the pitch but is gradually decomposed during the course where the pitch binder is infusibilized. The added polymeric material is assumed to effectively work chiefly in stages from the production of the moldings to the beginning of the carbonization, particularly giving its large effect at the molding stage.

Thus, the polymeric material is very effective for imparting the low dusting tendency and high level of strength to the activated carbon using the pitch as a starting material.

The use of the polymeric material which serves to change the pitch in nature may be applied to a field where a pitch is used as a binder, e.g. a field of electrode or coke, or of molding inorganic materials.

The preparation of starting pitch, molding, infusibilization and activation will be particularly illustrated by way of example. The characteristic properties of various types of activated carbon according to the invention and for comparative purpose and also of commercially available carbon are tabulated in the Table which will appear hereinlater.

EXAMPLE

Preparation of Starting Pitch

Starting pitch A was that which was obtained by spraying crude oil from Ceria into steam heated to 2000° C. to thermally crack in a contact time of 0.005 seconds, distilling the tar-like substance obtained after rapid cooling of the cracked oil, and collecting fractions of boiling points below 430° C. as calculated at a normal pressure. This pitch had a softening point of 201° C., a nitrobenzene-insoluble matter of 37%, a carbon content of 95%, and a hydrogen/carbon atomic ratio of 0.54.

Starting pitch B was that which was obtained by distilling a residual oil secondarily produced on ethylene cracking to remove fractions of boiling points below 540° C. from the oil, and which had a softening point of 225° C., a nitrobenzene-insoluble matter content of 21%, a carbon content of 94% and a hydrogen/carbon atomic ratio of 0.61.

Production of Activated Carbon 300 g of each of the thus obtained pitches, 100 g of naphthalene and each of polymeric materials indicated in Table 1 and used in an amount of 0–10% (by weight) of the pitch were placed in a 1-l autoclave, mixed, and molten or liquefied while agitating at 180° C. for 2 hours. The mixture was discharged into hot water heated to 160° C. and containing 0.5% by weight of polyvinyl alcohol in an autoclave, and dispersed at 1200 r.p.m. for 20 minutes for conversion into spherical forms, followed by cooling the system to obtain pitch spheres. The water was removed and the naphthalene in the spheres was extracted with n-hexane. The spheres were then placed in a fluidized bed, in which they were heated from room temperature up to 300° C. at a rate of 30° C./hr to give infusible pitch spheres. Thereafter, the spheres were heated to 900° C. for carbonization in an atmosphere of a gaseous mixture consisting of 50 vol% of nitrogen, 47 vol% of steam and 3 vol% of oxygen, and kept at 900° C. to obtain activated spherical carbon.

TABLE

| | Examples of Invention | | | | | | | | Comparative Examples | | Commercially available carbon A based on coal | Commercially available carbon B based on coconut husk |
|---|---|---|---|---|---|---|---|---|---|---|---|---|
| starting pitch | A | A | A | A | A | A | B | B | A | B | | |
| Added chain polymeric material* | polyethylene (P.E.) | polyethylene (P.E.) | polyethylene (P.E.) | polybutadiene (P.B.) | polystyrene (P.S.) | ethylene-vinyl-acetate copolymer (EVA) | polyethylene (P.E.) | polypropylene (P.P.) | nil | nil | — | — |
| amount of the chain polymer (% by weight of the pitch) | 0.5 | 3.0 | 7.0 | 1.0 | 1.0 | 3.0 | 1.0 | 3.0 | 0 | 0 | — | — |
| Characteristic Properties of Activated Carbon — Iodine absorption mg/g | 960 | 1080 | 1020 | 960 | 1040 | 960 | 1100 | 1050 | 1080 | 1130 | 980 | 1100 |
| carmel decoloration % | 70 | 83 | 88 | 72 | 89 | 82 | 93 | 79 | 82 | 91 | 92 | 80 |
| bulk density g/ml | 0.57 | 0.55 | 0.52 | 0.57 | 0.52 | 0.58 | 0.51 | 0.57 | 0.59 | 0.56 | 0.45 | 0.48 |
| specific surface area m²/g | 1000 | 1150 | 1060 | 1010 | 1050 | 1000 | 1100 | 1100 | 1150 | 1200 | 950 | 1150 |
| Dust test A wt % | no-detected | no-detected | no-detected | no-detected | no-detected | no-detected | no-detected | no-detected | 0.18 | 0.10 | 4.7 | 2.5 |
| Dust test B % | 85 | 89 | 94 | 82 | 83 | 79 | 96 | 83 | 2 | 19 | *0 | *0 |

TABLE-continued

| starting pitch | Examples of Invention | | | | | | | | Comparative Examples | | Commercially available carbon A based on coal | Commercially available carbon B based on coconut husk |
| --- | --- | --- | --- | --- | --- | --- | --- | --- | --- | --- | --- | --- |
| | A | A | A | A | A | A | B | B | A | B | | |
| strength % | 98.0 | 99.0 | 98.6 | 98.2 | 97.6 | 96.4 | 99.2 | 98.6 | 95.2 | 94.9 | 84.1 | 85.6 |

*Note)
P.E. : "SUMIKATHENE G-806" (Sumitomo Chemical Co. Ltd.)
P.B. : "Nipol Br 1220" (Nippon Zeon Co., Ltd.)
P.S. : "Esbrite GP-8" (Sumitomo Chemical Co., Ltd.)
EVA : "EVA FLEX-250" (Mitsui Polychemical Co., Ltd.)
P.P : "Moplen Type AS" (Montecatini Co., Ltd.)
(Note) :
The characteristic properties of the activated carbon in the Table were determined as follows.
Measuring Methods
Iodine Adsorption : Determined according to the method prescribed in JIS K-1474.
Caramel Decoloration : Determined according to the method prescribed in JIS K-1412.
Surface Area : Determined according to the $N_2$ adsorption method.
Dust test A : 10 g of a sample and 50 ml of distilled water were placed in a glass container with a diameter of 60 mm and a height of 80 mm and shaken at an amplitude of 40 mm at 250 r.p.m. for 30 minutes. The resulting suspension was passed through a 100 mℓ screen for filtration and washed with fresh distilled water. the filtrate was evaporated to dryness, followed by measuring an amount of the resulting fine powder.
Dust test B : 5 g of activated carbon was placed in a 200 ml Erlenmeyer flask, to which 50 ml of distilled water was added. After degassing, the flask was sealingly stoppered and shaken in a manner similar to the case of the above method A. Immediately after the shaking, the supernatant liquid was sampled and subjected to a measurement of light transmittance by means of a spectrophotometer using a wavelength of 660 mm.
Strength : Determined according to the method of JIS K-1474.
*In the item "Dust test B", the types of commercially avaiable carbon were found to produce large amount of black carbon, and 0.5 g of each sample was used to conduct the measuring test but little or no passage of light was recognized.

It will be appreciated by those skilled in the art that the instant specification and examples are set forth by way of illustration and not limitation, and that various changes and modifications may be made without departing from the spirit and scope of the present invention, which is to be limited only by the scope of the appended claims.

What is claimed is:

1. A process for producing spherical particles of activated carbon having a low susceptibility to dusting, comprising the steps of:
   heating while continuously stirring a mixture of a pitch having a softening point of 50° to 350° C., a carbon content of 80 to 97%, an atomic ratio of hydrogen to carbon of 0.3 to 2.0, and a content of nitrobenzene insoluble matter of below 60%, at least one aromatic compound miscible with said pitch and 0.1 to 10% by weight based on the amount of said pitch of at least one polymer or one copolymer having the chain hydrocarbon moiety as a major component thereof, thereby liquefying homogeneously said mixture;
   dispersing said liquefied mixture into an aqueous solution containing a suspending agent, thereby obtaining microspheres of said mixture dispersed in said solution; and
   subjecting the thus obtained microspheres to a series of treatments of removal of said aromatic compound, infusibilization, carbonization and activation.

2. The process of claim 1, wherein said heating of said mixture is carried out at a temperature of 150° to 200° C.

3. The process of claim 1, wherein said dispersing is carried out in said aqueous solution at a temperature of 50° to 200° C.

4. The process of claim 1, wherein said polymer or copolymer has a molecular weight less than about 500,000.

5. The process of claim 1, wherein said mixture contains 0.5 to 8% by weight of said polymer or copolymer based on the amount of said pitch.

6. The process of claim 1, wherein said polymer or copolymer is selected from the group consisting of polyethylene, polypropylene, polybutadiene, polystyrene, copolymers of ethylene and vinylacetate and their derivatives.

7. The process of claim 1, wherein said mixture contains 5 to 50% by weight of said aromatic compound based on the amount of said pitch.

8. The process of claim 1, wherein said aromatic compound miscible with said pitch is selected from the group consisting of benzene, toluene, xylene, naphthalene, methylnaphthalene, dimethylnapththalene, anthracene, phenanthrene, triphenylene, diphenyl, diphenylmethane, diphenyl ether and their alkyl derivatives.

9. The spherical particles of activated carbon produced by the process of claim 1, having the following properties:
   0.1 to 1.5 mm in diameter;
   0.5 to 1.5 g/ml of density of individual particles;
   800 to 1600 $m^2/g$ of specific surface area;
   about 0.3 ml/g, as measured in the range of micropore radius of below 100 Å, of micropore volume and also 0.5 ml/g, as measured in the range of micropore radius between 100 and 100,000 Å; and
   below 0.5% by weight of ash content.

10. The spherical particles of activated carbon having a low susceptibility to dusting and prepared by the process comprising the steps of:
    heating while continuously stirring a mixture of a pitch having a softening point of 50° to 350° C., a carbon content of 80 to 97% by weight, an atomic ratio of hydrogen to carbon of 0.3 to 2.0, and a content of nitrobenzene-insoluble matter of below 60% by weight, at least one aromatic compound miscible with said pitch and 0.1 to 10% by weight based on the amount of said pitch of at least one polymer or one copolymer having the chain hydrocarbon moiety as a major component thereof, thereby liquefying homogeneously said mixture;
    dispersing said liquefied mixture into an aqueous solution containing a suspending agent, thereby obtaining microspheres of said mixture dispersed in said solution; and subjecting the thus-obtained microspheres to a series of treatments of removal of said aromatic compound, infusibilization, carbonization and activation.

11. The spherical activated carbon of claim 10 which has the following physical characteristics: spheres of 0.1–1.5 mm in diameter; particle density of 0.5–1.5 g/ml specific surface area of 800–1600 m²/g; a micro-pore volume of above 0.3 ml/g as measured in the range of micro-pore radius of below 100 Å, and also of below 0.5 ml/g as measured in the range of micro-pore radius between 100 Å and 100,000 Å; and the ash content of below 0.5% by weight.

* * * * *